Oct. 5, 1971  J. C. MARTIN ET AL  3,610,132
FUNNEL FOR RECEIVING PREPACKAGED GROUND COFFEE
Filed July 29, 1970  4 Sheets-Sheet 3

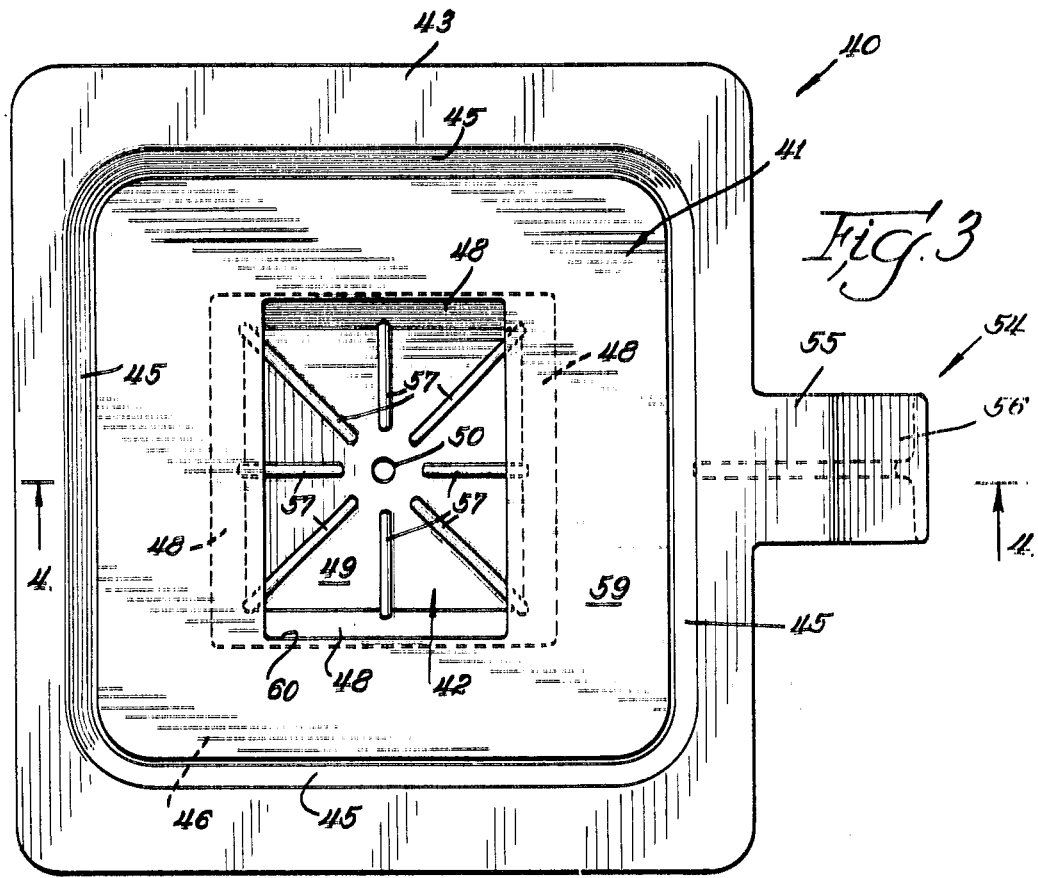
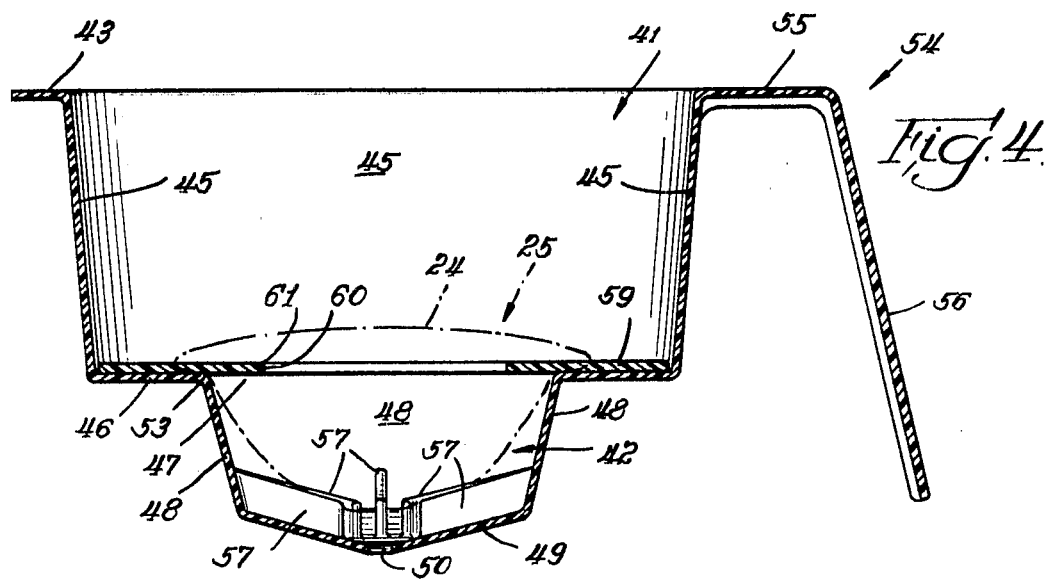

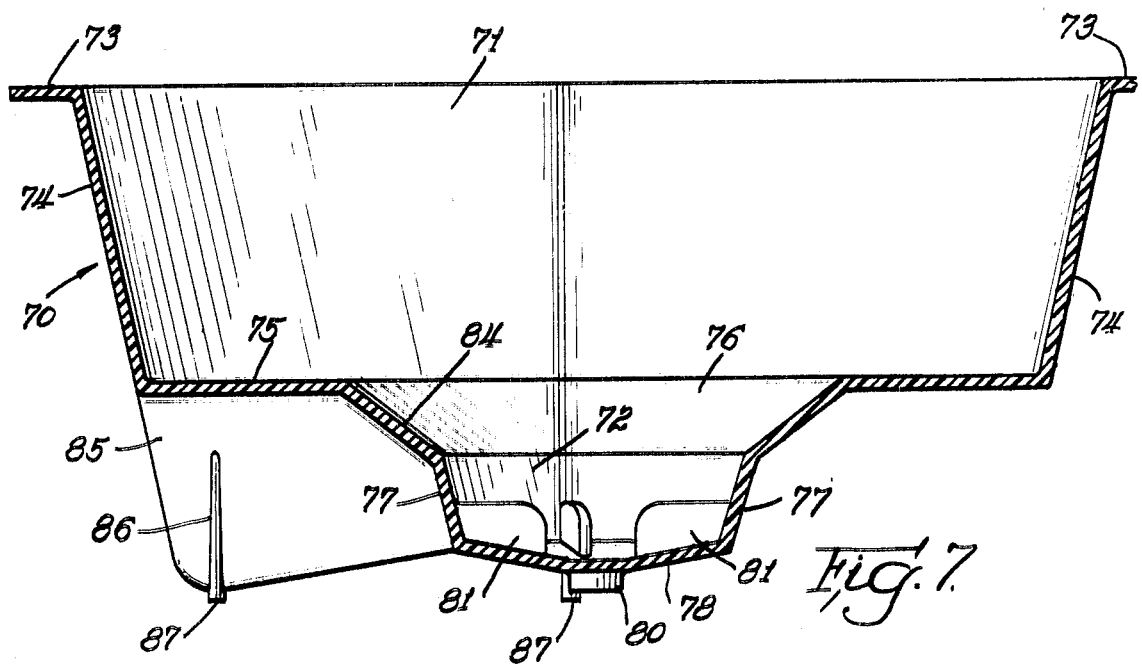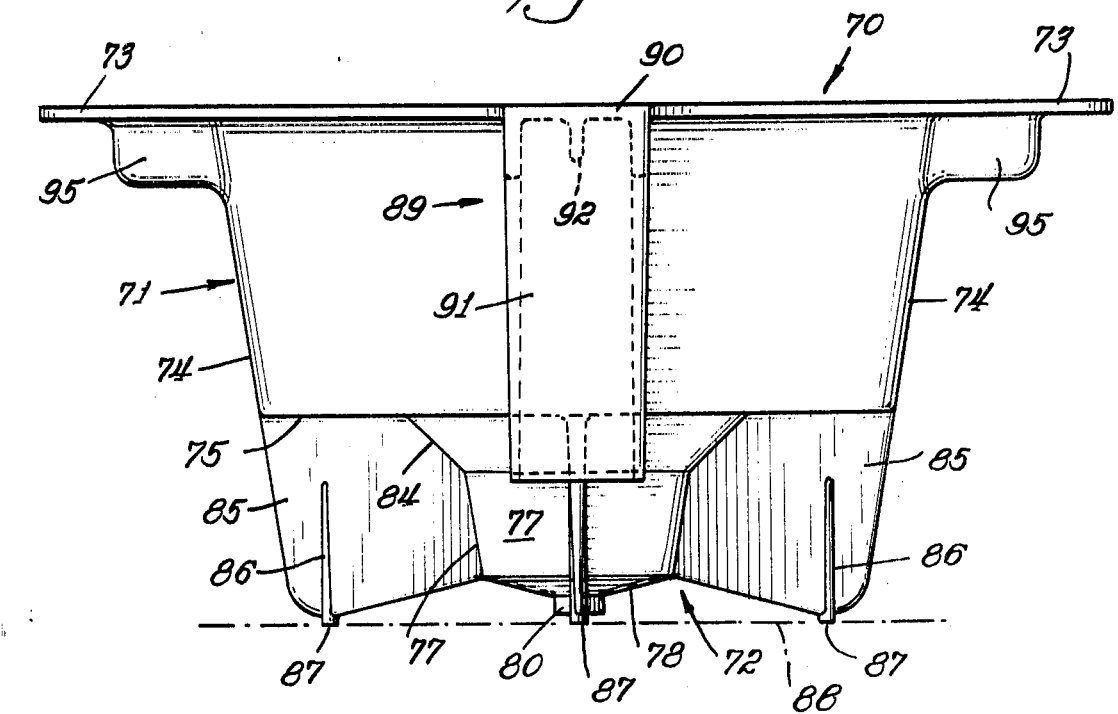

United States Patent Office 3,610,132
Patented Oct. 5, 1971

3,610,132
FUNNEL FOR RECEIVING PREPACKAGED GROUND COFFEE
John C. Martin and Edward J. Kniery, Springfield, Ill., assignors to Bunn-O-Matic Corporation, Springfield, Ill.
Continuation-in-part of application Ser. No. 878,861, Nov. 21, 1969. This application July 29, 1970, Ser. No. 59,225
Int. Cl. A47j 31/00
U.S. Cl. 99—295
14 Claims

ABSTRACT OF THE DISCLOSURE

A funnel has upper and lower large and small wells with a bottom wall of the upper well extending horizontally between the wells and having an opening through which a membrane of a package containing ground coffee can droop into the lower well and with the periphery of which the membrane has sealing engagement. An adapter plate can overlie the bottom wall of the upper well and has an opening of lesser area than the opening therein to accommodate different sizes of coffee containing packages. A handle extends laterally from a side wall of the upper well. When the funnel is formed of injection molded plastic, the handle is formed integrally with the side wall of the upper well and the bottom wall of the lower well has integral upstanding ribs to prevent the membrane from drooping far enough to close the discharge opening in the bottom wall of the lower well. To improve the seal with the membrane the bottom well is connected to the walls of the lower well by an inclined wall having a relatively large contact area with the membrane. Vertical flanges interconnect the underside of the bottom wall and outer sides of the lower walls to provide a support. A support flange extends laterally from the upper edges of a pair of opposite upper walls which have offset upper portions to stiffen the support flanges.

---

This application is a continuation-in-part of application Ser. No. 878,861, filed Nov. 21, 1969, now abandoned.

This invention is an improvement over the constructions disclosed in Martin U.S. Pat. No. 3,374,897, issued Mar. 26, 1968, and No. 3,450,024, issued June 17, 1969.

With a view to insuring the use of an exact amount of ground coffee in a machine in which an exact amount of hot water is available for a coffee making cycle, the required amount of ground coffee is packaged in a water permeable membrane. According to Pat. No. 3,450,024 a funnel of the prior art was modified to receive a pan for positioning therein the prepackaged ground coffee. While that arrangement provided a satisfactory construction, it was relatively expensive and somewhat difficult to thoroughly clean.

Accordingly, among the objects of this invention are: To provide a funnel arranged and constructed particularly for receiving prepackaged ground coffee; to form the funnel of plastic by either the vacuum forming or injection molding process; to provide upper and lower walls having relatively large and relatively small rectangular cross sections for receiving the prepackaged ground coffee in overlying relation to an opening in the bottom wall of the upper well; to provide for accommodating different sizes of packages of ground coffee; to arrange for sealing engagement between the membrane enclosing the ground coffee and the juxtaposed underlying edge of the bottom wall of the upper well; to extend the seal by providing for large area sealing engagement between an inclined wall interconnecting the bottom wall of the upper well and the side walls of the lower well; to interconnect the under side of the bottom wall and the outer sides of the walls of the lower well by vertical flanges and thereby provide support for the funnel; and to stiffen support flanges extending laterally from upper edges of a pair of opposite upper walls by providing upper portions of these walls offset from the lower portions thereof.

Figure 1:
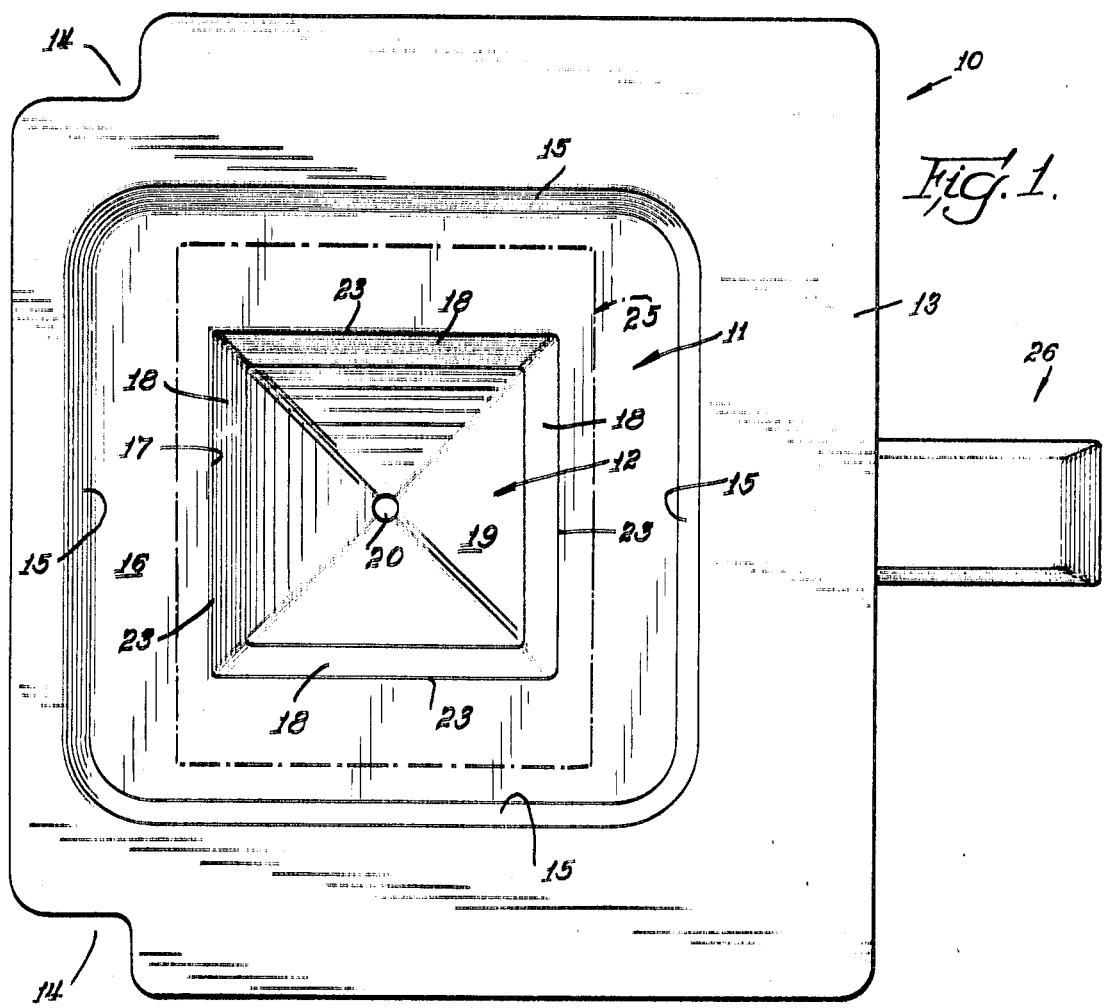
Figure 2:
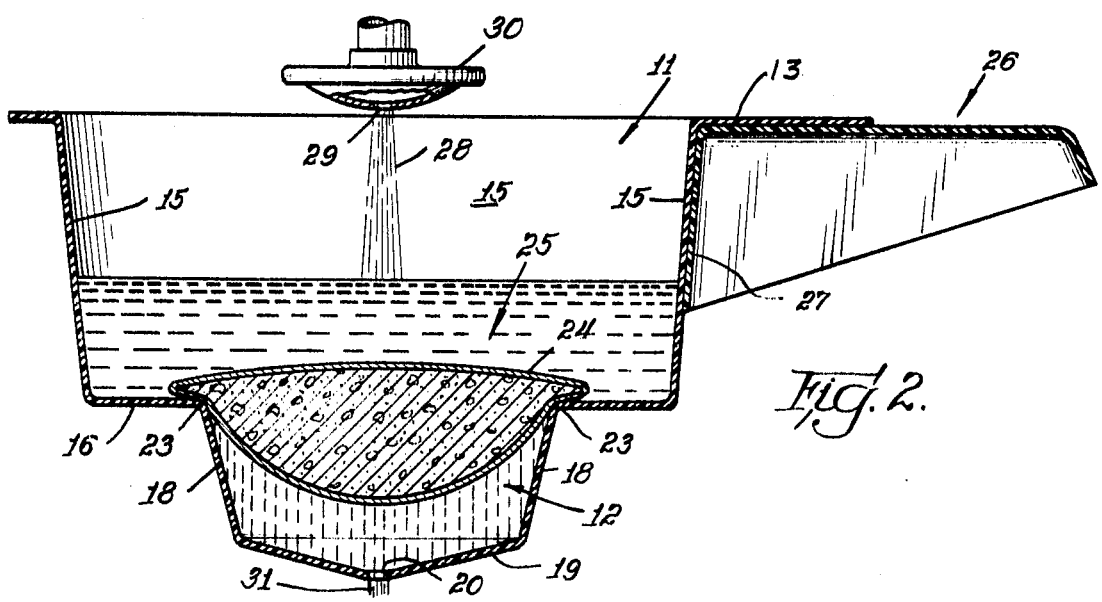
Figure 5:
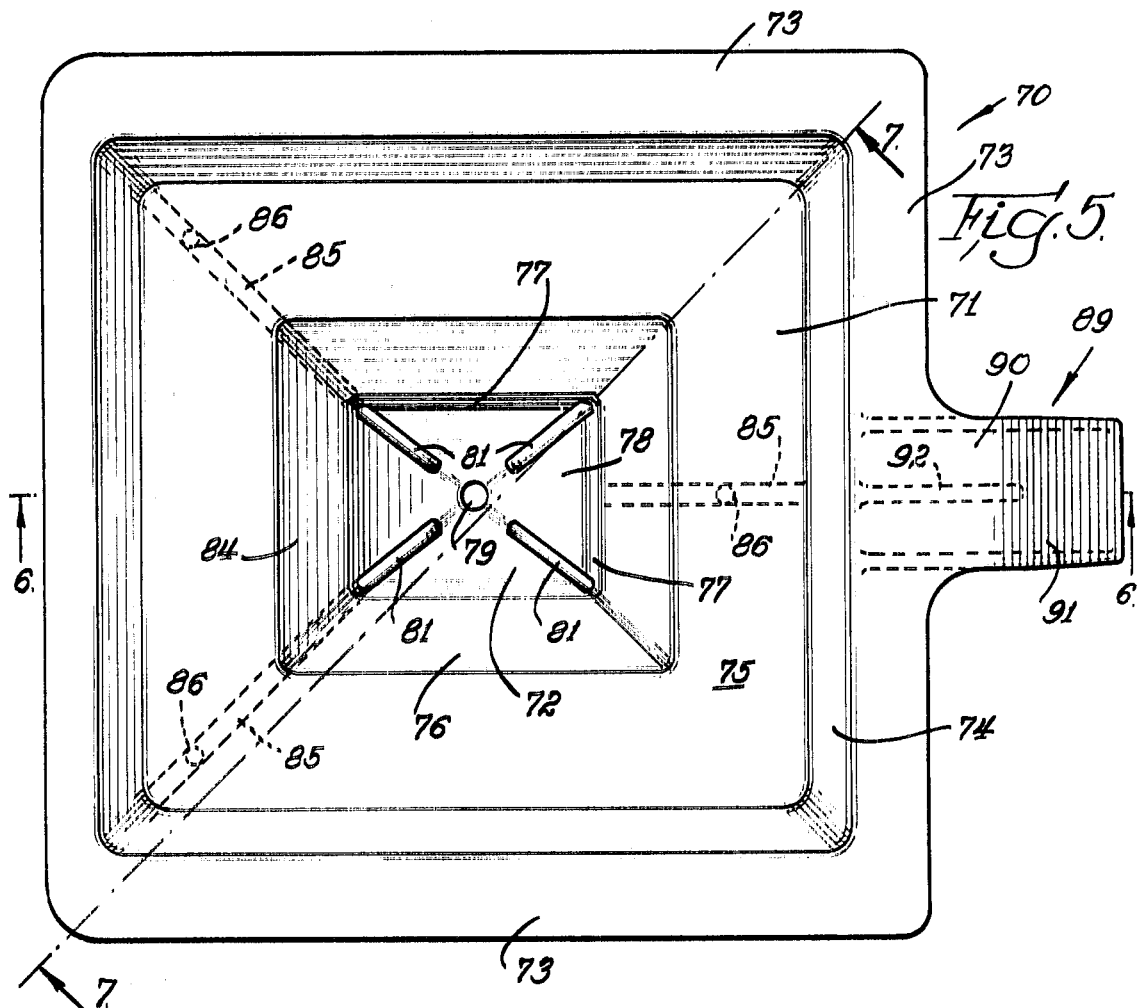
Figure 6:
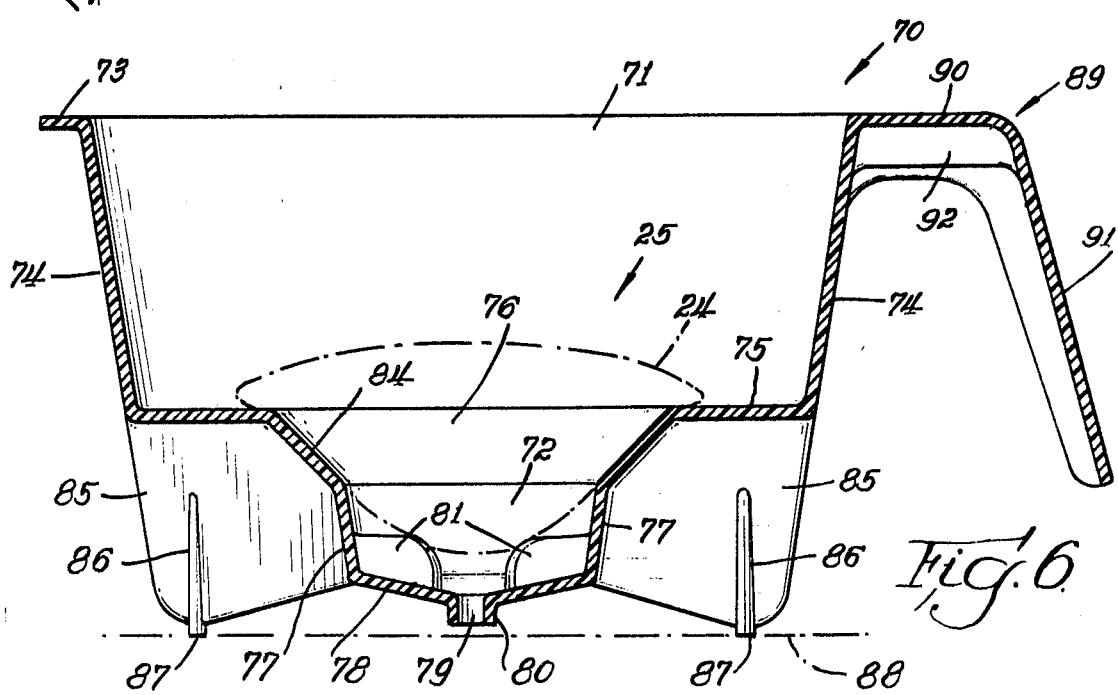

In the drawings: FIG. 1 is a top plan view of a funnel embodying one modification of this invention. FIG. 2 is a vertical sectional view taken generally centrally of FIG. 1 and showing the arrangement of the funnel with a package of ground coffee therein having hot water applied thereto. FIG. 3 is a top plan view of another embodiment of this invention. FIG. 4 is a vertical sectional view taken generally along line 4—4 of FIG. 3. FIG. 5 is a top plan view of still another embodiment of this invention in which large area sealing engagement with the package of ground coffee is provided. FIG. 6 is a vertical sectional view taken generally along line 6—6 of FIG. 5. FIG. 7 is a vertical sectional view taken generally along line 7—7 of FIG. 5. FIG. 8 is a view in end elevation of the funnel shown in FIG. 5, looking from right to left, modified to stiffen the laterally extending flanges along the upper edges of the opposite upper walls of the upper well.

Referring now to FIGS. 1 and 2 of the drawings, the reference character 10 designates, generally a funnel embodying this invention. The funnel is formed of plastic by a vacuum forming operation. It includes a rectangular upper well, shown generally at 11, having a relatively large cross section, and a rectangular lower well, indicated generally at 12, having a relatively small cross section. A support flange 13 extends laterally from the upper edge of the upper well 11. It has corner sections omitted, as indicated at 14, to facilitate entrance of the funnel 10 into operative position in a coffee making machine such as that illustrated in the patents above referred to.

The upper well 11 is formed by inwardly inclined side walls 15 terminating in a horizontal bottom wall 16 in which there is a rectangular opening 17. The bottom wall 16 joins with the upper ends of inwardly inclined side walls 18 which form the lower well 12. An inclined bottom wall 19 extends from the lower edges of the side walls 18 to a discharge opening 20 that is centrally located.

The junction 23 between the bottom wall 16 and the inwardly inclined side walls 18 is convex to provide sealing engagement with a water permeable membrane 24 of a package 25 of ground coffee. Initially the package 25 of ground coffee is relatively flat. It is positioned centrally of the bottom wall 16. As hot water is applied to the package 25, the membrane 24 becomes wet and the lower portion droops, as indicated in FIG. 2, into the lower well 12. At the same time a seal is formed with the convex junction 23 to insure that all of the hot water passes through the package 25.

In order to facilitate manipulation of the funnel 12 there is provided a laterally extending handle that is indicated, generally, at 26. Since the funnel 10 is vacuum formed, it is not feasible to form the handle 26 integrally therewith. Rather it is formed separately by the vacuum forming process of a suitable plastic and at end wall 27 is secured by adhesive to one of the side walls 15 of the upper well 11. The handle 26 is of inverted channel cross section.

In operation, the package 25 of ground coffee is placed in the funnel 10 in overlying relation to the opening 17 in the bottom wall 16. Then the assembly is inserted in the coffee making machine and a stream 28 of hot water is discharged through a single aperture 29 in a nozzle 30 into the upper well 11. As shown in FIG. 2 the hot water fills the lower portion of the upper well 11 and flows through the package 25 so that coffee extract is formed in the lower portion of the lower well 12 and flows in a stream 31 from the discharge opening 20 in the bottom wall 19 into a suitable receptacle therebelow. When a predetermined quantity of hot water has been discharged into the upper well 11, the discharge from the nozzle 30 ceases. The hot water continues to flow through the package 25 and the coffee extract continues to flow from the discharge opening 20 until the end of the coffee brewing cycle. Thereupon, the funnel 10 is removed from the coffee making machine by grasping the handle 26. It is turned upside down over a suitable waste receptacle to permit the spent package 25 of ground coffee to fall into it.

FIGS. 3 and 4 show a funnel, generally, at 40, that is formed of plastic by an injection molding process. It is quite similar to the funnel 10 described above. The funnel 40 includes a rectangular upper well, shown generally at 41, having a relatively large cross section and a rectangular lower well, shown generally at 42, having a relatively small cross section. A support flange 43 extends laterally from the upper end of the upper well 41 to provide a support for the funnel 40 when it is inserted in a coffee making machine of the kind and character disclosed in the patents above referred to.

The upper well 41 is formed by inwardly inclined side walls 45 and a horizontal bottom wall 46 having a rectangular opening 47 therethrough. The bottom wall 46 is formed integrally with inwardly inclined side walls 48 of the lower well 42. At its lower end the lower well 42 has an inclined bottom wall 49 provided with a centrally located discharge opening 50 through which the coffee extract flows as described above. There is a convex junction 53 between the bottom wall 46 of the upper well 41 and the upper ends of the side walls 45 of the lower well 42 to provide sealing engagement with the water permeable membrane 24 of the package 25 of ground coffee as previously described.

Molded integrally with the funnel 40 is a handle that is indicated, generally, at 54. It includes a horizontal section 55 that extends laterally from the support flange 43 and from one of the side walls 45. It terminates in an outwardly inclined section 56 which facilitates it being grasped by the hand of the operator for manipulating the funnel 40.

When the package 25 of ground coffee becomes wet, the lower portion droops into the lower well 42. It is desirable that this portion of the membrane 24 be prevented from coming into close contact with the upper side of the inclined bottom wall 49 where it close off the discharge opening 50. In order to prevent this upstanding ribs 57 are molded integrally with the upper side of the bottom wall 49. As shown in FIG. 3, the ribs 57 extend radially from the discharge opening 50 and provide the support for the under side of the drooping portion of the membrane 24.

With a view to accommodating different sizes of packages 25 of ground coffee an adapter plate, indicated generally at 59, is employed. The adapter plate 59 is formed of suitable plastic and is generally rectangular. It has a central rectangular opening 60 which is somewhat smaller than the rectangular opening 47 in the bottom wall 46 of the upper well 41. The adapter plate 59 overlies the bottom wall 46 and its smaller opening 60 accommodates a corresponding smaller package 25 of ground coffee. The opening 60 has a convex edge 61 for the purpose of providing sealing engagement with the package 25 of ground coffee.

In FIGS. 5-8 the reference character 70 designates, generally, a plastic funnel that is formed by an injection molding process which is different in certain respects from the funnels 10 and 40 previously described. The funnel 70 is particularly well adapted for receiving the package 25 of ground coffee enclosed in the water permeable membrane 24. The construction of the funnel 70 is such as to provide a seal with the membrane 24 to the end that all of the hot water received infuses the ground coffee with none bypassing it.

The funnel 70 is formed of an integral one piece construction which provides a rectangular upper well 71 and a rectangular lower well 72. A support flange 73 extends laterally from the upper edge of the upper well 71 with opposite sides being arranged to be received in suitable guide rails in a coffee making machine.

The upper well 71 is formed by inwardly inclined side walls 74 the length of which may vary depending upon the size of the coffee making machine with which the funnel 70 is intended to be used. A horizontal wall 75 extends inwardly from the lower edges of the side walls 74 and it has an opening 76 for receiving the package 25 of ground coffee.

The lower well 72 is formed by inwardly inclined side walls 77 which also may vary in length depending upon the size of the funnel 70. The side walls 77 terminate in an inclined bottom wall 78 having a centrally located discharge opening 79 through a depending spout 80. Ribs 81, integral with the inclined bottom wall 78 extend upwardly therefrom to prevent the lower portion of the membrane 74 from closing off the entrance to the discharge opening 79.

With a view to providing improved sealing engagement with the membrane 74 an inclined wall 84 is arranged to interconnect the horizontal bottom walls 75 of the upper well 71 and the upper ends of the side wall 77 of the lower well 72. Preferably the angle of inclination of the wall 84 is 45°. The inclined wall 84 is of such dimensions that it provides a relatively large contact area with the membrane 24 of the package 25 of ground coffee. Using this construction there is little likelihood that any of the hot water supplied to the upper well 71 will bypass the package 25 of ground coffee.

In order to support the funnel 70 when it is removed from the coffee making machine vertical flanges 85 are provided. They are formed integrally with the undersides of the horizontal bottom wall 75 and of the inclined wall 84 as well as with the undersides of the side wall 77 of the lower well 72. Vertical ribs 86 are formed integrally with the vertical flanges 85 of which are are 3 in number and their lower ends 87 extend below the lower end of the spout 80 for engaging a horizontal surface that is indicated by broken line 88.

Formed integrally with one of the side walls 74 of the upper well 71 and with the support flange 73 is a handle that is indicated, generally, at 89. The handle 89 is channel shaped in the cross section and includes a horizontal lateral section 90 and a down turned section 91 to be gripped by the hand of an operator. A reinforcing rib extends underneath the lateral section 90 to increase the rigidity of the handle 89.

FIG. 8 shows a slightly different construction from that illustrated in FIGS. 5, 6 and 7. Here a pair of opposite side walls 74 of the upper well 71 have offset upper portions 95 from which the corresponding sections of the support flange 73 extend. This construction serves to stiffen the corresponding portions of the support flange 73 and is of particular importance when the funnel 70 is of the larger size.

Preferably the vertical flanges are tapered from top to bottom while the vertical ribs are effectively of uniform circular cross section.

What is claimed as new is:

1. A funnel for holding ground coffee in a package formed of a water permeable membrane to receive hot water from a discharge head comprising:
   upper and lower wells formed by upper and lower walls, said upper well having a larger cross sectional area than said lower well,
   a bottom wall of said upper well interconnecting said upper and lower walls for receiving said package and having an opening through which said membrane can droop into said lower well, and a bottom wall of said lower well inclined to a discharge opening.

2. The funnel according to claim 1 wherein the junction between said bottom wall of said upper well and the walls of said lower well is convex to have sealing engagement with said membrane.

3. The funnel according to claim 1 wherein said wells have rectangular cross sections with downwardly and inwardly inclined side walls and said bottom wall of said upper well extends horizontally between said wells.

4. The funnel according to claim 1 wherein an adapter plate overlies said bottom wall of said upper well and has an opening of less area than said opening in said bottom wall through which said membrane can droop.

5. The funnel according to claim 1 wherein a handle extends laterally from a side wall of said upper well.

6. The funnel according to claim 1 wherein a handle integral with a side wall of said upper well extends laterally and downwardly therefrom.

7. The funnel according to claim 1 wherein ribs integral with said bottom wall of said lower well extend upwardly therefrom.

8. The funnel according to claim 1 wherein an inclined wall interconnects said bottom wall and said lower walls and provides a relatively large contact area with said water permeable membrane and thereby a seal preventing flow of hot water therebetween.

9. The funnel according to claimb 8 wherein said inclined wall has an angle of inclination of about 45° with said bottom wall.

10. The funnel according to claim 1 wherein a plurality of vertical flanges interconnect the under side of said bottom wall and the outer sides of said lower walls to provide a support for said funnel.

11. The funnel according to claim 10 wherein each of said flanges is tapered from top to bottom and is provided on opposite sides with vertically extending ribs the lower ends of which project below said flanges and provide feet for engaging a horizontal support surface.

12. The funnel according to claim 11 wherein a handle extends outwardly and downwardly from one of said upper walls.

13. The funnel according to claim 1 wherein:
said upper well has a generally rectangular cross section and one pair of opposite walls have support flanges extending laterally from the upper edges thereof, and the upper portions of said opposite walls are offset from the lower portions thereof and thereby stiffen said support flanges.

14. The funnel according to claim 13 wherein a handle extends outwardly and downwardly from one of said upper walls between said pair of walls.

References Cited

UNITED STATES PATENTS

| | | | |
|---|---|---|---|
| 3,320,073 | 5/1967 | Bixby | 99—295 |
| 3,450,024 | 6/1969 | Martin | 99—295 |
| 3,479,949 | 11/1969 | Reynolds | 99—295 |
| 3,502,017 | 3/1970 | Alexander | 99—295 |

ROBERT W. JENKINS, Primary Examiner

U.S. Cl. X.R.

210—455